(12) United States Patent
Handa

(10) Patent No.: US 6,198,859 B1
(45) Date of Patent: *Mar. 6, 2001

(54) DISPERSION COMPENSATING DEVICE USING DISPERSION COMPENSATING FIBER MODULE

(75) Inventor: Takayuki Handa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,093

(22) Filed: Dec. 3, 1997

(30) Foreign Application Priority Data

Dec. 5, 1996 (JP) .................................. 8-324917

(51) Int. Cl.⁷ ........................................ G02B 6/26
(52) U.S. Cl. .................................. 385/27; 385/24
(58) Field of Search .................. 385/15, 24, 27

(56) References Cited

U.S. PATENT DOCUMENTS

| 4,953,939 | * | 9/1990 | Epworth | 385/15 X |
| 5,037,180 | * | 8/1991 | Stone | 385/123 |
| 5,404,413 | * | 4/1995 | Delavaux et al. | 385/15 |
| 5,608,562 | * | 3/1997 | Delavaux et al. | 359/161 |

FOREIGN PATENT DOCUMENTS

| 406276160A | * | 9/1994 | (JP) . |
| 6-276160 | | 9/1994 | (JP) . |
| 8-204258 | | 8/1996 | (JP) . |
| 8-288904 | | 11/1996 | (JP) . |
| 8-316912 | | 11/1996 | (JP) . |

OTHER PUBLICATIONS

Japanese Office Action, dated Aug. 24, 1999, with English language translation of Japanese Examiner's comments.

* cited by examiner

*Primary Examiner*—Rodney Bovernick
*Assistant Examiner*—Michael J. Stahl
(74) *Attorney, Agent, or Firm*—McGuire Woods LLP

(57) ABSTRACT

A dispersion compensating device for compensating dispersion of signal light. In an optical fiber communication system, distortion of optical pulse waveform caused by wavelength distortion is compensated. The signal light is inputted through an input port, propagating through a dispersion compensating fiber through a port of an optical circulator. The signal light is reflected by a totally internal highly reflective surface, again propagating through the dispersion compensating fiber reciprocally, thus being outputted through an output port of the optical circulator. Since the signal light propagates through the dispersion compensating fiber reciprocally, the dispersion compensating fiber is capable of compensating dispersion with one-half the length of the conventional example.

6 Claims, 1 Drawing Sheet a definition of the limit of the invention.

DISPERSION COMPENSATING DEVICE USING DISPERSION COMPENSATING FIBER MODULE

BACKGROUND OF THE INVENTION

The present invention relates to a dispersion compensating device using a dispersion compensating fiber module for compensating dispersion which is generated in a transmission line of optical fiber communication system.

Description of the Related Art

In the optical fiber communication system, the researches concerning speeding up of transmission rate and improvement of transmission characteristic are advanced in order to enlarge both transmission capacity and transmission distance. The optical fiber which is used as the transmission line of the optical fiber communication system has characteristic of wavelength dispersion that different wavelength of the signal light effects different propagation speed in answer to respective wave-length of signal light. In particular, a waveform distortion of an optical pulse caused by the wavelength dispersion maybe large, when the transmission speed is high speed for example, more than 1 Gb/s. Thus, the characteristic of transmission extremely deteriorates. A method is known for compensating for waveform distortion that results in a dispersion compensating fiber to be arranged. Such dispersion compensating fiber has the same dispersion quantity as the dispersion value corresponding to the transmission line, and has an inverse sign. Such dispersion compensating fiber is provided for the reception side.

However, the standard characteristic of the dispersion compensating fiber is that a dispersion value is −100 ps/nm/km, and a loss factor is 0.8 dB/km. Consequently, when the transmission line becomes long, it is necessary to increase the length of the dispersion compensating fiber corresponding thereto. Because of these increased lengths, costs can become very high. For example, when the optical fiber whose dispersion value is +20 ps/nm/km of 100 km is used, total dispersion quantity becomes 2000 ps/nm, thereby the dispersion compensating fiber of 20 km is necessary to compensate thereof. Further, when the transmission line is 300 km, the dispersion compensating fiber of 60 km is required.

SUMMARY OF THE INVENTION

In view of the foregoing, it is an object of the present invention for resolving the above-mentioned problem to provide a dispersion compensating device using a dispersion compensating fiber module which is capable of compensating the distortion of the optical pulse waveform caused by wavelength distortion using a low-priced constitution.

In accordance with one aspect of the present invention, for achieving the above-mentioned objectives, there is provided a dispersion compensating device which comprises a three port optical circulator having an input port, an intermediate port, and an output port in which a signal light inputted from the input port is transmitted to the intermediate port, then the signal light is transmitted from the intermediate port to the output port; a dispersion compensating fiber module with a first end section combined with the intermediate port of the optical circulator for compensating dispersion of the signal light by propagating the signal light therethrough; and a reflection means provided for a second end section of the dispersion compensating fiber module for reflecting the signal light by means of a totally internal, highly reflective surface thereof.

Preferably, the dispersion compensating fiber module comprises a dispersion compensating fiber whose first end face is combined with the intermediate port of the optical circulator while a second inside end face is formed by a totally internal, highly reflective surface.

Preferably, length of the dispersion compensating fiber is of one-half the length corresponding to necessary dispersion compensating quantity.

Preferably, the dispersion compensating fiber has a dispersion value of −95 ps/nm/km, and a loss factor of 0.8 dB/km.

Preferably, the optical circulator has a passing loss of 1.2 dB.

Preferably, the second inside end face of the dispersion compensating fiber is coated with dielectric multilayer whose reflectance ratio is approximately 99.5%.

In accordance with another aspect of the present invention, there is provided a dispersion compensating method which comprises the steps of inputting a signal light to an input port of a optical circulator, transmitting the signal light to an intermediate port of the optical circulator, inputting the signal light to a dispersion compensating fiber which is combined with the intermediate port of the optical circulator, propagating the signal light through the dispersion compensating fiber for compensating dispersion of the signal light, reflecting the signal light into the dispersion compensating fiber by means of a totally internal, highly reflective surface so as to return to the intermediate port, and transmitting the signal light from the intermediate port to the output port.

The above and further objects and novel features of the invention will be more fully understood from the following detailed description when the same is read in connection with the accompanying drawings. It should be expressly understood, however, that the drawings are for purpose of illustration only and are not intended as a definition of the limit of the invention.

DETAILED DESCRIPTION OF THE PREFERRED EMBODIMENT

A preferred embodiment of the invention will now be described in detail referring to the accompanying drawings.

Figure 1:
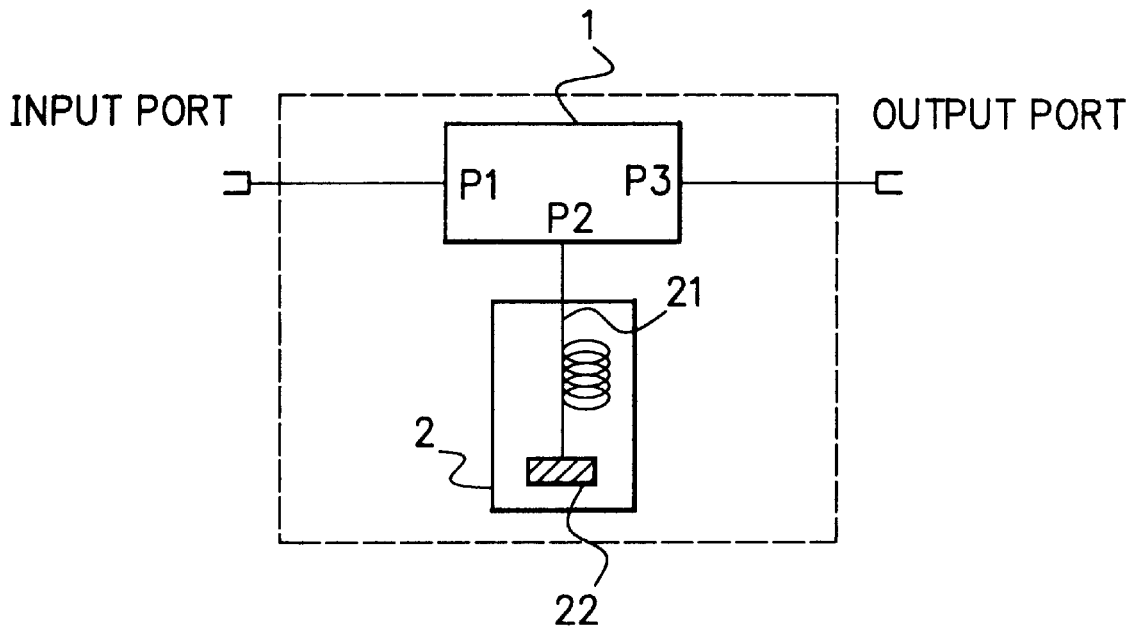
FIG. 1 is a constitution view showing one embodiment of a dispersion compensating device using a dispersion compensating fiber module according to the present invention.
Figure 2:
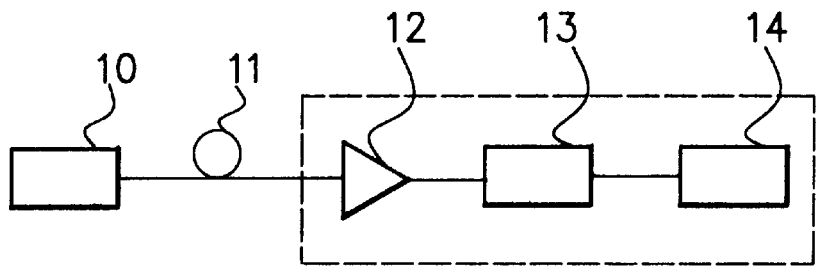
FIG. 2 is a block diagram showing optical transmission system for experimenting on the dispersion compensating fiber module of FIG. 1.

FIG. 1 is a constitution view showing one embodiment of a dispersion compensating fiber module according to the present invention. FIG. 2 is a block diagram showing optical transmission system for experimenting the dispersion compensating fiber module of FIG. 1.

In FIG. 1, an optical circulator 1 has three ports: input port P1, intermediate port P2, and output port P3. A dispersion compensating fiber 21 constituting a dispersion compensating fiber module 2 is combined with the intermediate port P2. The dispersion compensating fiber 21 has a dispersion amount of −80 to −120 ps/nm/km. Further a first end face of the dispersion compensating fiber 21 is combined with the intermediate port P2, while a second end face having a reflectance ratio of more than 99% is counter to the first end face.

In this constitution, when the signal light is inputted through the input port P1, the signal light propagates through the dispersion compensating fiber 21 passed through the intermediate port P2. Next, the signal light is reflected by the end face 22 to return to the dispersion compensating fiber 21, thus propagating through the dispersion compensating fiber 21 to be outputted through the output port P3 of the optical circulator. Consequently, since the signal light goes and returns through the dispersion compensating fiber 21, the dispersion compensating fiber 21 is capable of compensating dispersion by one-half the distance corresponding to the dispersion compensating fiber of the conventional example. Besides, in the dispersion compensating fiber 21, when dispersion amount is a negative amount, it is proper that positive dispersion amount of +15 to +25 ps/nm/km can be used.

Next, a concrete example will be described. The dispersion compensating fiber 21 of 20 km is used. A property of the dispersion compensating fiber 21 is that the dispersion amount is +95 ps/nm/km, and the loss factor is 0.8 dB/km, with the result that total dispersion compensating quantity comes to be −1900 ps/nm. The end face 22 is coated with dielectric multilayer, so as to have a reflectance ratio of 99.5%. The optical circulator 1 is of the passing loss of 1.2 dB.

Consequently, according to the dispersion compensating fiber module 2, which fiber module 2 is capable of realizing total dispersion compensating quantity of −3800 ps/nm which corresponds to two times the dispersion compensating quantity of the dispersion compensating fiber 21 used as single-alone substance. Further, the dispersion compensating fiber module 2 is capable of accommodating within the space of diameter of 200 mm, and thickness of 180 mm. Furthermore, since the passing loss of the optical circulator 1 is sufficiently small as compared with loss of the dispersion compensating fiber 21 itself, a demerit does not occur even though the optical circulator 1 is used.

Next, there have been implemented the transmission experimentation of light signal of 10 Gb/s on the system as shown in FIG. 2, in order to confirm effectiveness of the above dispersion compensating fiber module 2. In FIG. 2, the light signal is transmitted to an optical receiver 14 from an optical transmitter 10, via an optical fiber transmission line 11, an Er-doped fiber amplifier 12, and the dispersion compensating fiber module 13 of the present invention in order. The constitution of the optical transmitter 10 is that oscillation light of semiconductor laser of the wavelength with 1.55 $\mu$m is modulated by LiNbO$_3$-waveguide type intensity modulator. Pure silica core fiber of 1.3 $\mu$m-zero dispersion of 200 km is put to use for the optical fiber transmission line 11. The wavelength dispersion quantity at a point of 1.55 $\mu$m of this fiber is of +20 ps/nm/km, and the total dispersion quantity is of +4000 ps/nm/km.

A noise factor of the Er-doped fiber amplifier 12 is of 5 dB, and gain thereof is of 40 dB. In terms of the dispersion compensating fiber module 13, the module of the total dispersion compensating quantity with −3800 ps/nm described above is used. InGaAs-PIN photo diode is put to use for light receiving element of the optical receiver 14. Further, a signal which is subjected to photoelectric conversion by the InGaAs-PIN photo diode is amplified by the GaAs-field-effect transistor type amplifier, before the signal which is capable of regenerating is used.

In this experimentation system, receiving sensitivity of an input end of the Er-doped fiber amplifier 12 is measured. As the result of the measurement, there is confirmed that bit error rate of $1\times10^{-11}$ is obtained at −33.5 dB. When there is no transmission line of back-to-back condition, the receiving sensitivity is of −34 dB. The amount of −33.5 dB is of deterioration of only 0.5 dB as compared with the receiving sensitivity of −34 dB in back-to-back having no transmission line. In contrast thereto, when the dispersion compensating fiber module 13 is eliminated, the system is incapable of obtaining the bit error rate of $1\times10^{-11}$, because in this system, "floor-state" occurs, in which error is of uncountable state.

In order to compare with the conventional example, there is used the dispersion compensating fiber that length of fiber is of −40 km which is two times fiber-length of the dispersion compensating fiber module 13, and that total dispersion compensating quantity is of −3800 ps/nm. The receiving sensitivity thereof is of −33.3 dB. Consequently, due to the experimentation, the dispersion compensating fiber module 13 is capable of maintaining the same performance with one-half the length of the fiber as that of the conventional example. As the result thereof, it is shown that the dispersion compensating fiber module of this embodiment can be miniaturized and still shorten the necessary length of fiber by one-half with the same performance maintained.

As described above, in accordance with the present invention, since it causes one end face of the dispersion compensating fiber to combine with the optical circulator, while it causes the other end face to be formed into a highly reflective surface, it is capable of shortening the length of the dispersion compensating fiber into one-half the length thereof. Consequently the distortion of the optical pulse waveform caused by the wavelength dispersion is capable of being compensated using low-priced constitution.

While preferred embodiments of the invention have been described using specific terms, such description is for illustrative purpose only, and it is to be understood that changes and variations may be made without departing from the spirit or scope of the following claims.

What is claimed is:

1. A dispersion compensating device comprising:

a three port optical circulator having an input port, an intermediate port, and an output port in which a signal light input from said input port is transmitted to said intermediate port and to said output port;

a dispersion compensating fiber module having a first end combined with said intermediate port of said optical circulator for compensating dispersion of said signal light by propagating said input signal light therethrough; and a reflection means provided at a second end of said dispersion compensating fiber module for reflecting said signal light by means of a highly reflective surface thereof, wherein said highly reflective surface is totally internal to said dispersion compensating fiber module and includes a reflectance ratio of more than 99%, wherein said dispersion compensating fiber module is one-half a length corresponding to a necessary dispersion compensating quantity and has a dispersion amount which is in the range of −80 to −120 ps/nm/km for positive dispersion and +15 to +25 ps/nm/km for negative dispersion and has a loss factor of 0.8 dB/km.

2. A dispersion compensating device as claimed in claim 1, wherein said dispersion compensating fiber module has a dispersion amount which is −95 ps/nm/km for positive dispersion.

3. A dispersion compensating device as claimed in claim 1, wherein said second end inside face of said dispersion compensating fiber module is coated with dielectric multilayer whose reflectance ratio is approximately 99.5%.

4. A dispersion compensating device as claimed in claim 1, wherein said dispersion compensating fiber module is capable of accommodating within a diameter of 200 mm and a thickness of 180 mm.

5. A dispersion compensating device as claimed in claim 1, wherein said optical circulator has a passing loss of 1.2 dB.

6. A dispersion compensating method comprising the steps of:

inputting a signal light to an input port of said optical circulator;

transmitting said signal light to an intermediate port of said optical circulator;

inputting said signal light to a dispersion compensating fiber module which is combined with said intermediate port of said optical circulator;

propagating said signal light through said dispersion compensating fiber module for compensating dispersion of said signal light;

reflecting said signal light into said dispersion compensating fiber by means of a highly reflective surface, wherein said highly reflective surface is totally internal to said dispersion compensating fiber module, so as to return to said intermediate port, and wherein said dispersion compensating fiber module comprises a dispersion compensating fiber having a first end face combined with said intermediate port of said optical circulator and a second end inside face formed into a highly reflective surface, said dispersion compensating fiber module being one-half a length corresponding to a necessary dispersion compensating quantity and having dispersion amount which is in the range of −80 to −120 ps/nm/km for positive dispersion and +15 to +25 ps/nm/km for negative dispersion and having a loss factor of 0.8 dB/km; and transmitting said signal light from said intermediate port to an output port.

* * * * *